United States Patent
Ku et al.

(10) Patent No.: US 7,154,408 B2
(45) Date of Patent: Dec. 26, 2006

(54) WIRELESS REMOTE CONTROLLER HAVING NAVIGATION FUNCTION AND METHOD OF PROVIDING NAVIGATION FUNCTION TO THE SAME

(75) Inventors: Tae-hyun Ku, Incheon (KR); Ji-hyun Sun, Seoul (KR); Hoe-seong Ha, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 184 days.

(21) Appl. No.: 10/763,316

(22) Filed: Jan. 26, 2004

(65) Prior Publication Data
US 2004/0207765 A1 Oct. 21, 2004

(30) Foreign Application Priority Data
Apr. 21, 2003 (KR) ............... 10-2003-0025238

(51) Int. Cl.
*G08B 5/00* (2006.01)
(52) U.S. Cl. .................. 340/815.6; 340/539.1; 348/134
(58) Field of Classification Search ........... 340/815.6, 340/825.72, 539.1, 815.4; 345/158; 348/134, 348/734
See application file for complete search history.

(56) References Cited

U.S. PATENT DOCUMENTS

| | | | |
|---|---|---|---|
| 4,712,105 A | 12/1987 | Köhler | 340/825.69 |
| 5,410,326 A | 4/1995 | Goldstein | 348/134 |
| 5,450,079 A | 9/1995 | Dunaway | 341/23 |
| 6,040,829 A * | 3/2000 | Croy et al. | 715/864 |
| 6,107,992 A * | 8/2000 | Ishigaki | 345/158 |
| 6,211,856 B1 * | 4/2001 | Choi et al. | 345/666 |
| 6,215,417 B1 * | 4/2001 | Krass et al. | 341/20 |
| 6,407,779 B1 | 6/2002 | Herz | 348/734 |

FOREIGN PATENT DOCUMENTS

| | | |
|---|---|---|
| JP | 9-307968 A | 11/1997 |
| JP | 10-322782 A | 12/1998 |
| KR | 1996-0015364 B1 | 11/1996 |
| KR | 1998-047715 A | 9/1998 |
| KR | 1999-011182 A | 2/1999 |
| KR | 1999-0048990 A | 7/1999 |
| KR | 2000-0038706 A | 7/2000 |
| KR | 2000-0042807 A | 7/2000 |
| KR | 2002-0002296 A | 1/2002 |
| KR | 20-0292435 YI | 10/2002 |
| KR | 2003-0000580 A | 1/2003 |
| WO | WO 96/27968 A2 | 9/1996 |

* cited by examiner

*Primary Examiner*—Phung T. Nguyen
(74) *Attorney, Agent, or Firm*—Sughrue Mion, PLLC

(57) ABSTRACT

Disclosed herein is a wireless remote controller having a navigation function and method of providing the navigation function to the same. The remote controller of the present invention includes a wireless transmission/reception unit, a display unit, a storage unit, at least tow function keys, a mode switching element, a device information selecting key, and a control unit. The function keys selectively operate in a first mode in which remote control key code information is transmitted through the wireless transmission/reception unit to devices and a second mode in which the device information is navigated. The device information selecting key selects information of one or more devices. The control unit controls the remote control key code information to be transmitted through the wireless transmission/reception unit in the first mode, and in the second mode controls the information of the device to be provided to the display.

19 Claims, 7 Drawing Sheets

WIRELESS REMOTE CONTROLLER HAVING NAVIGATION FUNCTION AND METHOD OF PROVIDING NAVIGATION FUNCTION TO THE SAME

This application claims the priority of Korean Patent Application No. 10-2003-0025238 filed on Apr. 21, 2003 in the Korean Intellectual Property Office, the disclosure of which is incorporated herein in its entirety by reference.

FIELD OF THE INVENTION

The present invention relates generally to wireless remote controllers, and more particularly to a wireless remote controller having a navigation function and method of providing the navigation function to the same.

BACKGROUND OF THE INVENTION

In general, currently used wireless remote controllers may be classified into three types depending upon their appearances, as shown in FIGS. 1a to 1c: button type remote controllers (see FIG. 1a) each having only buttons, hybrid remote controllers (see FIG. 1b) each having a small-sized Liquid Crystal Display (LCD) and buttons, and LCD type remote controllers (see FIG. 1c) each having a large-sized LCD. Further, the wireless remote controllers may be classified into two types depending upon their functions: specific apparatus-only wireless remote controllers to be used for a specific device, and general purpose wireless remote controllers to be usable for various types of devices. In particular, in the case of general purpose wireless remote controllers, with the development of technology, various devices and new functions are developed, so that schemes for accommodating these devices and functions are required. For these schemes, in the case of the button type wireless remote controllers or hybrid wireless remote controllers, a new button is added thereto and a dual button is implemented therein to allow a button to perform two functions, and in the case of the LCD type wireless remote controllers, the information of a new function is downloaded via the Internet or a learning function is used. The LCD type remote controllers generally employ a touch screen.

However, in those schemes, the button type and hybrid wireless remote controllers are disadvantageous in that the layout of buttons is complicated by the addition of buttons, and the size of the remote controllers is increased or the size of buttons is decreased by the implementation of a large number of buttons, thus inconveniencing users. The LCD-type remote controllers are also disadvantageous in that users must be accustomed to the learning function, thus inconveniencing the users.

Accordingly, demands have increased for new types of remote controllers that allow users to use various functions of devices and to accommodate new devices and new functions.

SUMMARY OF THE INVENTION

An object of the present invention is to provide a remote controller having a navigation function and a method of providing the navigation function to the same, in which a hybrid remote controller having both a LCD and buttons is provided with a navigation function, so that users can easily use various functions of devices and so that the information of additional devices and functions can be received therethrough. In this way, usability and expandability of the remote controller are improved.

In order to accomplish the foregoing and other objects, the present invention provides a wireless remote controller having a navigation function, comprising a first mode in which remote control key code information is transmitted through a wireless transmission/reception unit to a device to be controlled, and a second mode in which information of devices provided by a display unit of a input means is navigated.

The present invention further provides a wireless remote controller having a navigation function, including a wireless transmission /reception unit for wirelessly communicating with devices to be controlled, which receive remote control signals and operate in response to the received remote control signals; a display unit for displaying information of the devices, a storage unit for storing the information of the devices and remote control key code information of the devices, at least two function keys for selectively operating in a first mode in which remote control key code information corresponding to an input of a user is transmitted through the wireless transmission/reception unit and a second mode in which the information of devices displayed on the display unit is navigated to select information of a desired device, or more than one desired device, a mode switching element for selecting one of the first and second modes; a device information selecting key for selecting information of one or more devices from the information of the devices navigated in the second mode, and a control unit for controlling the remote control key code information corresponding to the input of the user to be transmitted through the wireless transmission/reception unit in the first mode, and for controlling the information of the device corresponding to the input of the user to be provided to the display unit in the second mode.

Preferably, the remote control key code information corresponding to the input of the user is not transmitted through the wireless transmission/reception unit in the second mode.

Preferably, the display unit provides the information of devices stored in the storage unit in icon form.

Preferably, the function keys include a channel selecting key.

Also preferably, the function keys include a sound selecting key.

Also preferably, the function keys include a channel selecting key and a sound selecting key.

Preferably, the information of devices includes identification information of the devices.

Also preferably, the information of devices includes function information of the devices.

Also preferably, the information displayed for devices includes device deleting information for deleting the identification information of devices.

Preferably, the information displayed for devices includes function deleting information for deleting the function information of devices.

Also preferably, the remote controller having a navigation function further comprises an interface unit for receiving the information of devices from an outside system.

In addition, the present invention provides a method of providing a navigation function to a wireless remote controller, including the first step of switching a first mode where remote control key code information of devices to be controlled is wirelessly transmitted to a second mode where information of devices is provided to a user; the second step of navigating the information of devices in the second mode; and the third step of selecting information of one or more desired devices from the information of the devices. In this case, the second step may further comprise the step of navigating the information about the devices without wireless transmission of the remote control key code information corresponding to the input of the user in the second mode.

Preferably, the second step further comprises the step of navigating the information about the devices without wireless transmission of the remote control key code information corresponding to the input of the user in the second mode.

Preferably, the information about the devices includes identification information of the devices.

Preferably, the display of the information about the devices includes function information of the devices.

Preferably, the display of the information about the devices includes device deleting information for deleting the identification information of devices.

Preferably, the information about the devices includes function deleting information for deleting the function information of devices.

Preferably, the second mode provides the device information in the form of icons.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A wireless remote controller having a navigation function and method of providing the navigation function to the same is described below with reference to the accompanying drawings.

Figure 1A:
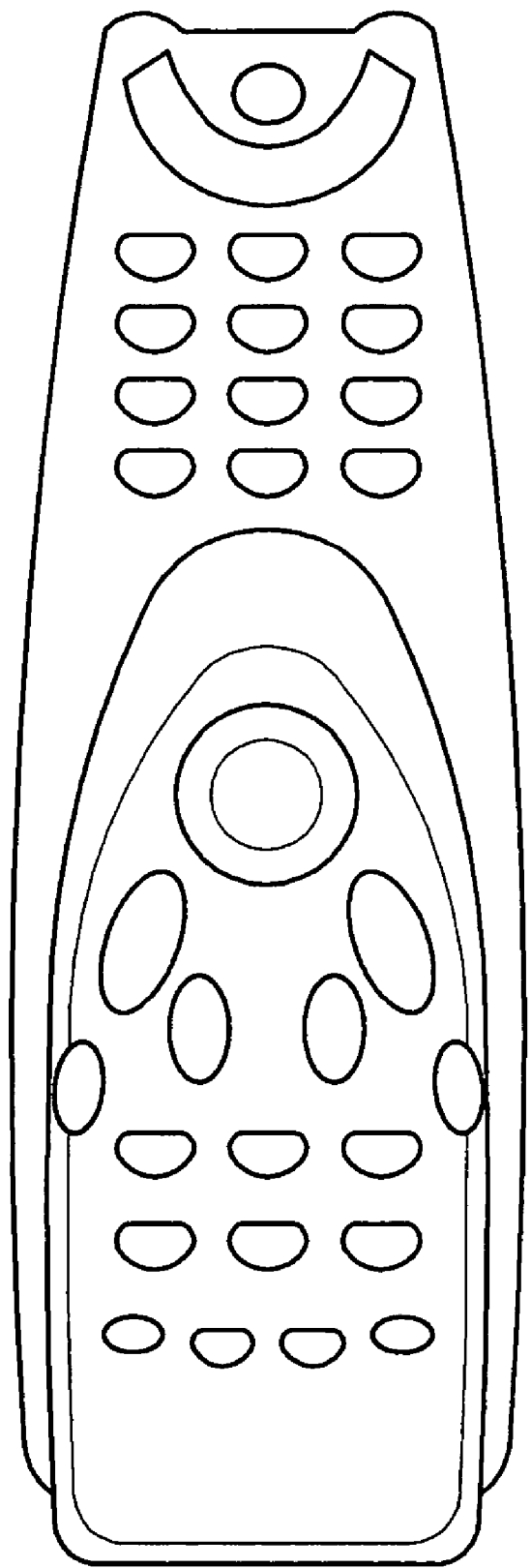
FIG. 1a is a view of a conventional button type remote controller.
Figure 1B:
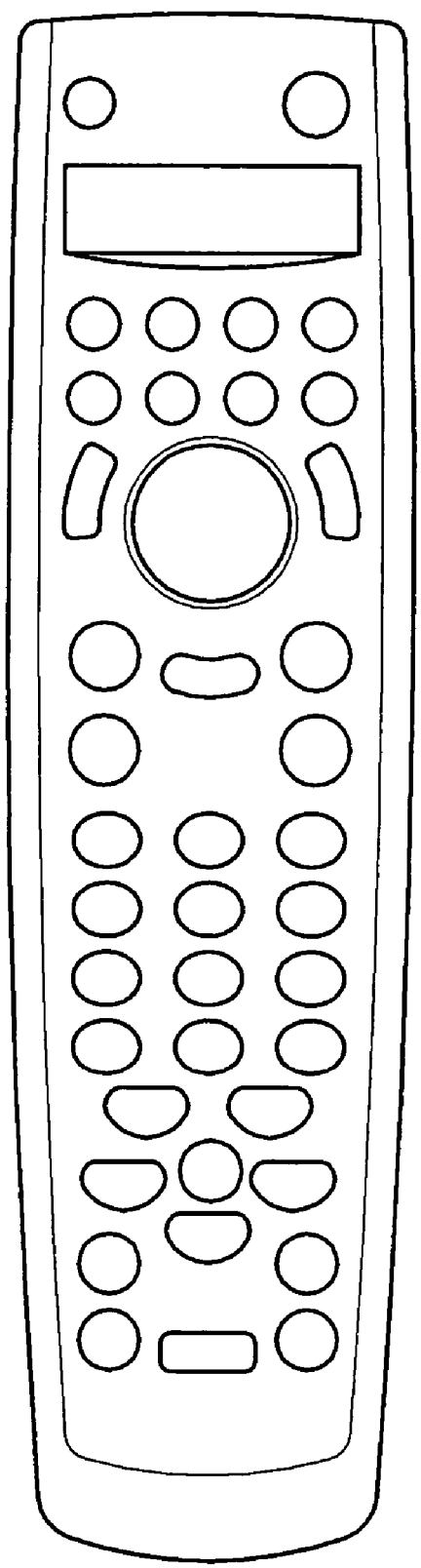
FIG. 1b is a view of a conventional hybrid remote controller.
Figure 1C:
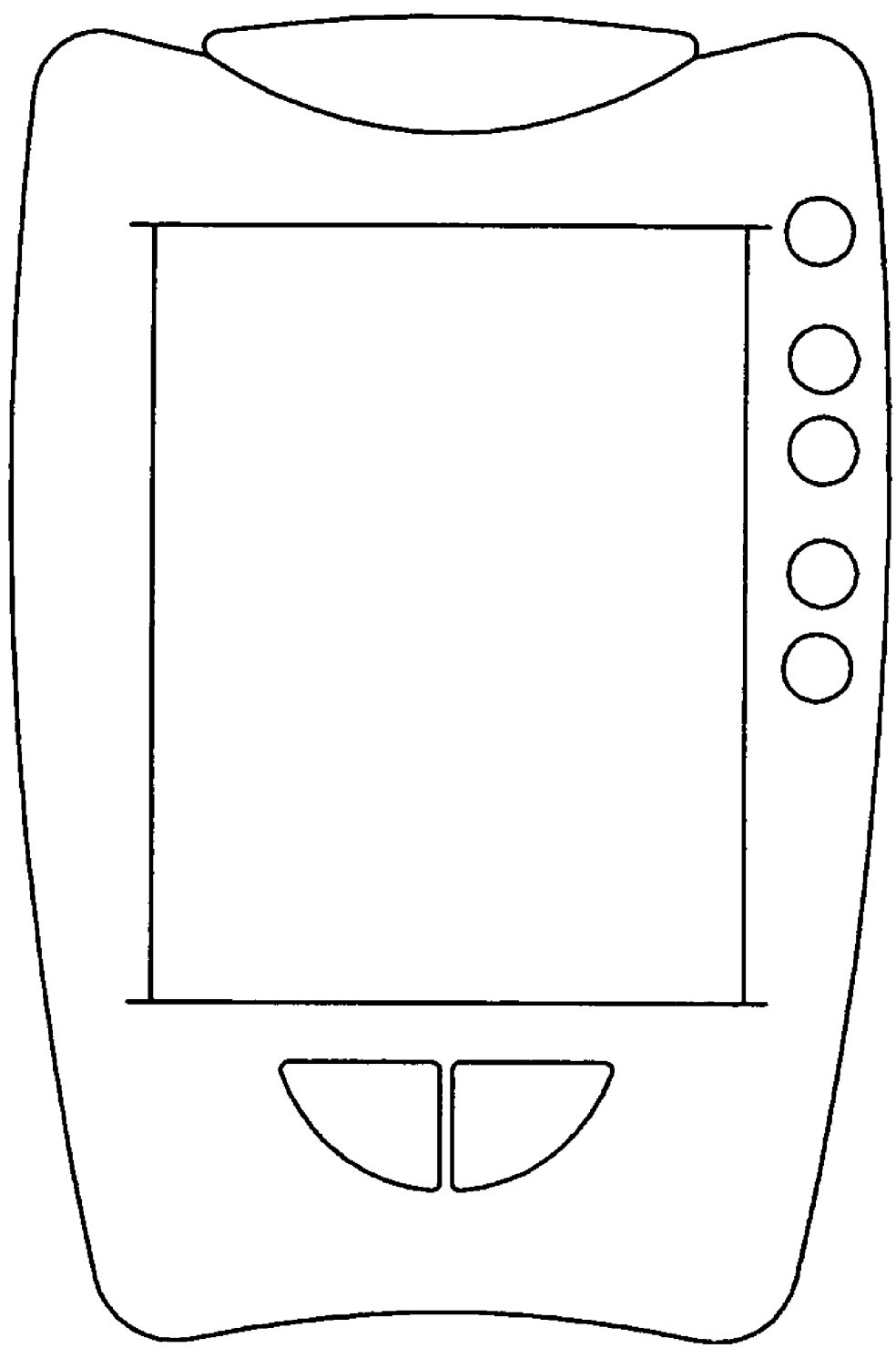
FIG. 1c is a view of a conventional LCD type remote controller.
Figure 2:
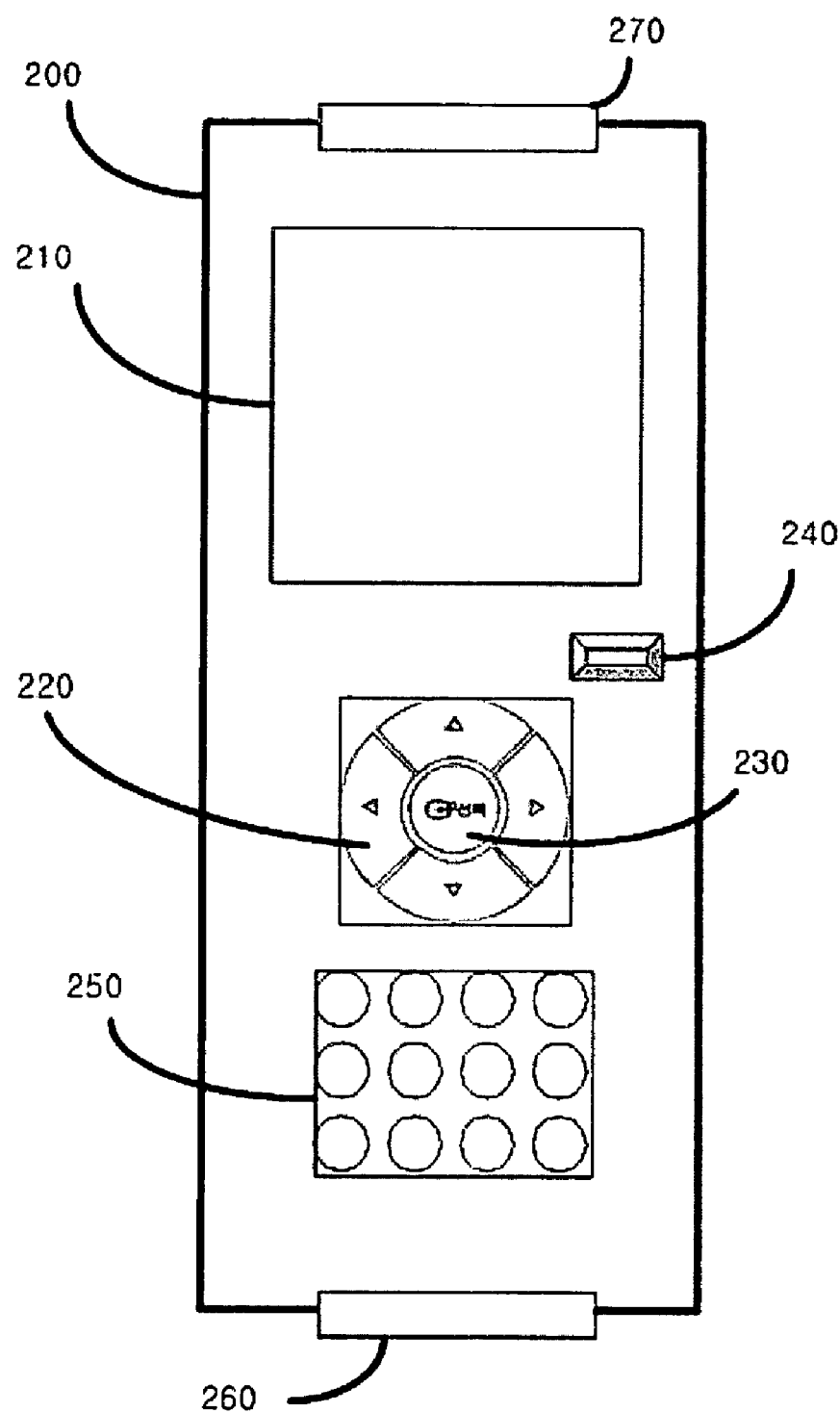
FIG. 2 is an exemplary view showing a wireless remote controller in accordance with the present invention.

FIG. 2 is an exemplary view showing a wireless remote controller in accordance with the present invention. A wireless remote controller 200 of the present invention includes a wireless transmission/reception unit 270 for communicating with devices to be controlled in an infrared communications or a radio frequency communications manner, a LCD screen 210 for displaying the information about the devices, a mode switching button 240 for switching the remote controller 200 between a remote control mode and a device information providing mode, four direction input buttons 220 for navigating the information of devices displayed on the LCD screen 210 in the device information providing mode while performing a general remote control function, a selection button 230 for selecting the information of one or more desired devices from the device information displayed on the LCD screen 210, general function buttons 250 for performing general remote functions, and an interface unit 260 for downloading data from an outside system through a serial port such as a Universal Serial Bus (USB) to collect and update the information of devices and collecting and updating the device information through or by the wired or wireless Internet. The device information displayed on the LCD screen 210 may be provided in the form of icons, text, moving images or some combination of the foregoing. Additionally, the four direction input buttons 220 and the selection button 230 may be provided in an integrated form, such as a joy stick, without being separated from each other. The mode switching button 240 may be provided in the form of an on/off type button or a slide type button. Additionally, the device information includes the identification information of devices, the function information of devices, the deletion information of devices, and the deletion information of functions. Further, the general function buttons 250 perform general functions, such as the input of numbers and the change of channels.

Figure 3:
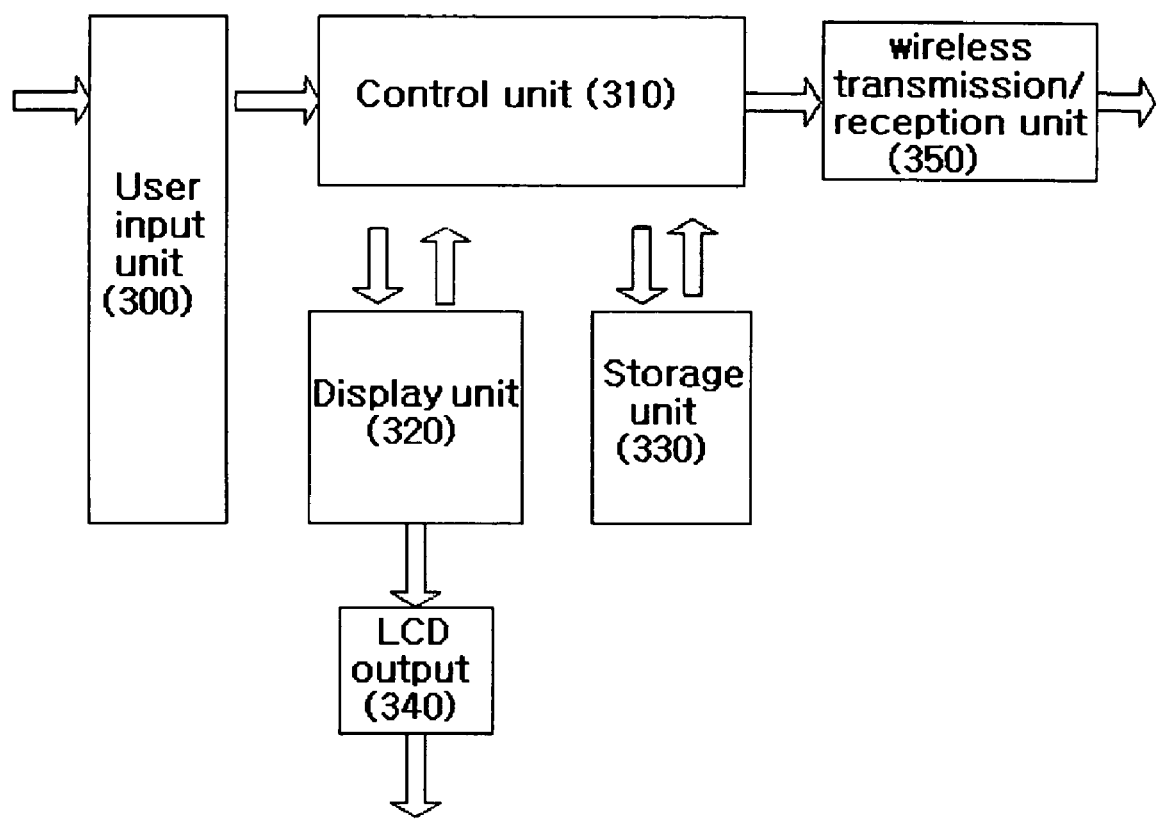
FIG. 3 is a block diagram showing the internal construction of the wireless remote controller in accordance with the present invention.

FIG. 3 is a block diagram showing the internal construction of the wireless remote controller in accordance with the present invention. The wireless remote controller of the present invention includes a wireless transmission/reception unit 350 for wirelessly communicating with devices that receive remote control signals and operate in response to the received signals, a display unit 320 for displaying the device information, a storage unit 330 for storing the device information and the remote control key code device information, a user input unit 300 including at least two function keys for selectively operating in a first mode where remote control key code information corresponding to an input of the user is transmitted through the wireless transmission/reception unit 350 and a second mode in which the device information displayed on the display unit 320 is navigated in order to select the information for one or more desired devices, a mode switching element for selecting one of the first and second modes, and a device information selecting key for selecting the device information of one or more desired devices from the device information navigated in the second mode, and a control unit 310 for controlling the remote control key code information corresponding to the input of the user to be transmitted through the wireless transmission/reception unit 350 in the first mode, and for controlling the information of the device corresponding to the input of the user to be provided to the display unit 320 in the second mode.

In the first mode, the user input unit 300 receives an input from the user, the control unit 310 extracts remote control key code information from the storage unit 330 and transmits the remote control key code information to the wireless transmission/reception unit 350, and the wireless transmission/reception unit 350 transmits infrared signals or radio frequency signals to a device to be controlled, thus operating the device according to the function selected by the user.

When the user switches the remote controller to the second mode through the mode switching element, the control unit 310 extracts the information of a device existing in the form of icon, text or moving image information from the storage unit 330, provides the information of the device to the display unit 320, and causes the information of the device to be displayed on a screen through a LCD output 340. In this case, when the user navigates the device information provided by the display unit 320 using the function keys of the user input unit 300, radio frequency signals are not generated. Additionally, when the user selects the information of one or more desired devices or functions using the device information selecting key of the user input unit 300, the control unit 310 generates radio frequency signals, or radio frequency signals are not generated in the case where sub-devices or sub-functions corresponding to the devices or functions selected by the user are present. If the user switches the remote controller from the second mode to the first mode, the function keys of the user input unit 300 do not perform a navigation function, but perform a general remote controller function. In this case, the control unit 310 extracts a key code, which is stored in the storage unit 330, corresponding to the input of the user and transmits radio frequency signals through the wireless transmission/reception unit 350.

Figure 4A:
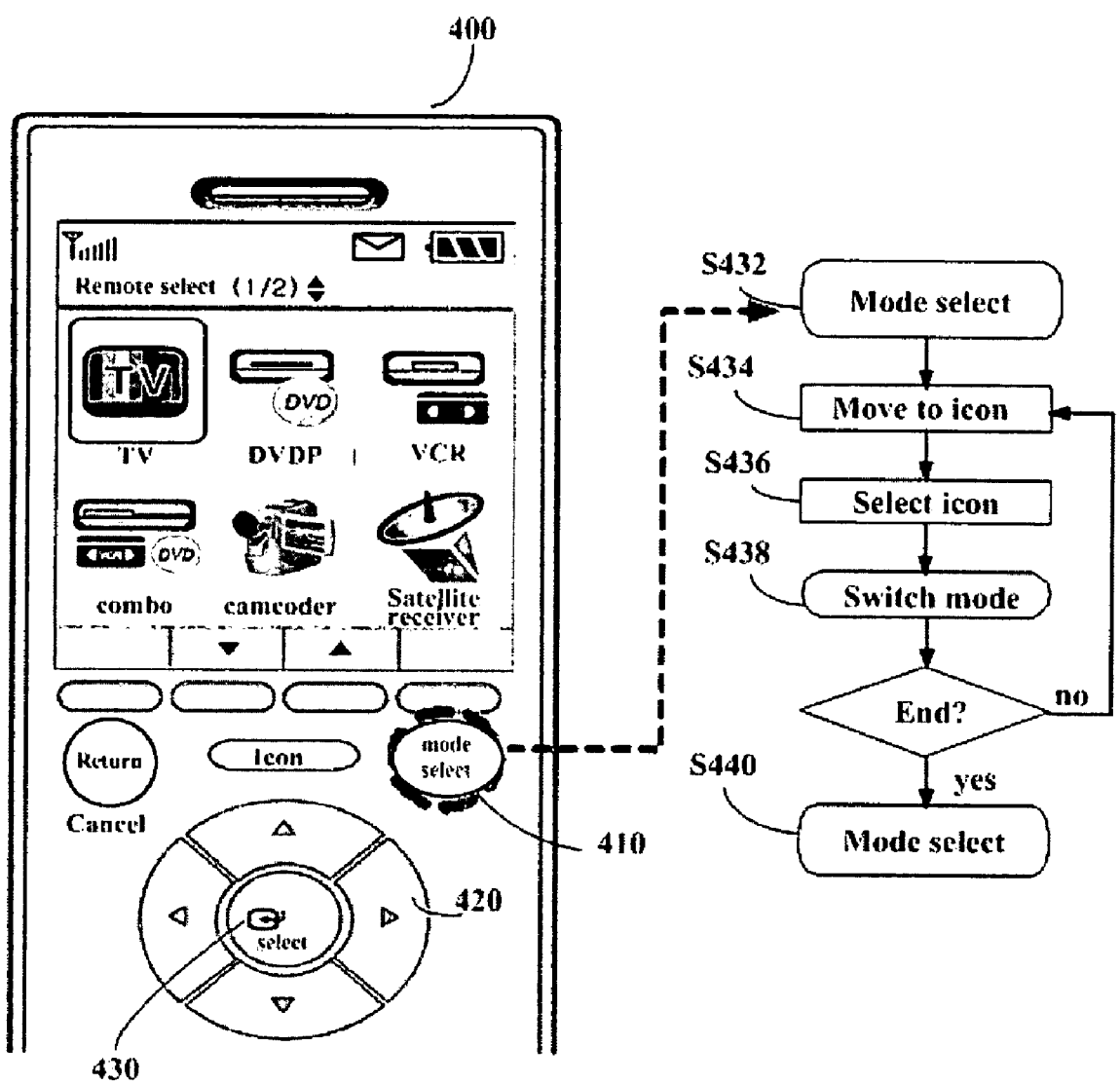
FIG. 4a is a flowchart showing the process of selecting a device in accordance with the present invention.
Figure 4B:
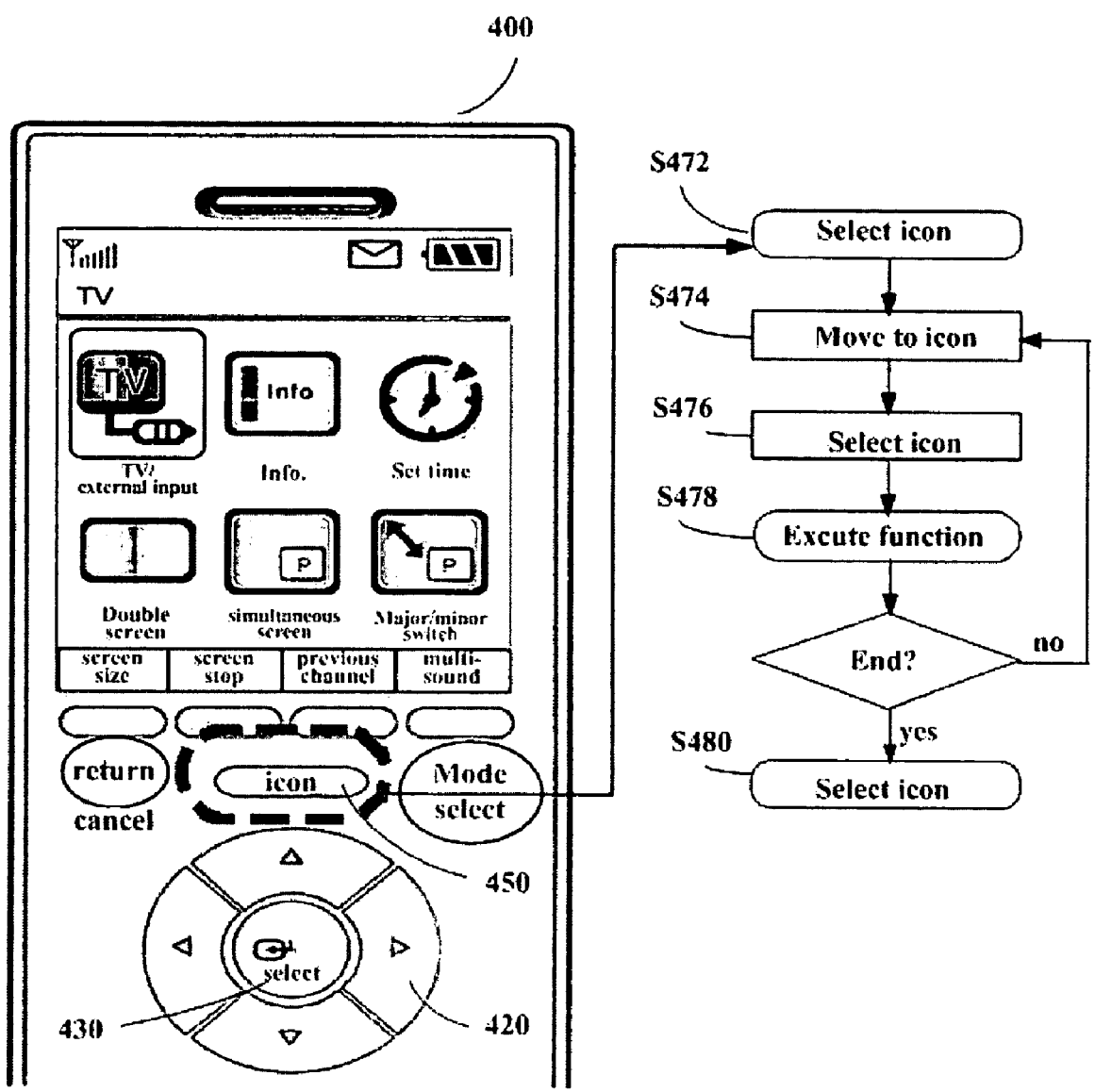
FIG. 4b is a flowchart showing the process of selecting a function in accordance with the present invention.

FIGS. 4a and 4b are flowcharts showing an embodiment of the present invention in which the mode switching element of the user input unit 300 is implemented as a remote control selection button 410 for obtaining the identification information of a device and an icon button 450 for obtaining the function information of a device.

FIG. 4a is a flowchart showing the process of selecting a device in accordance with the present invention. When the remote control selection button 410 is pressed at step S432, the icons of devices are displayed on an LCD. As soon as the remote control selection button 410 is pressed, the four direction input buttons 420 and the selection button 430 are switched to LCD navigation buttons and, therefore, infrared rays are not generated even when the four direction input buttons 420 and the selection button 430 are pressed. However, when the selection button 430 is pressed, infrared rays may be generated depending upon the types of the remote controllers. When the remaining buttons except for the four direction input buttons 420 and the selection button 430 are pressed, infrared rays are continuously generated. After the user moves to the icon of a desired device using the four direction input buttons 420 at step S434, the user selects the icon of the desired device using the selection button 430 at step S436 and switches the remote controller to a remote control mode for the selected device at step S438. When the user presses the remote control selection button 410 once more after switching the remote controller to the remote control mode at step S440, the icons displayed on the LCD are removed, and the four direction input buttons 420 and the selection button 430 return to their original functions.

FIG. 4b is a flowchart showing the process of selecting a function in accordance with the present invention. When the user presses the icon button 450 of the remote controller 400 at step S472, the icons of functions are displayed on the LCD. As soon as the icon button 450 is pressed, the four direction input buttons 420 and the selection button 430 are switched to LCD navigation buttons and, therefore, infrared rays are not generated even when the four direction input buttons 420 and the selection button 430 are pressed. However, when the selection button 430 is pressed, infrared rays may be generated depending upon the types of the remote controllers. When the remaining buttons except for the four direction input buttons 420 and the selection button 430 are pressed, infrared rays are continuously generated. After the user moves to the icon of a desired function using the four direction input buttons 420 at step S474, the user selects the icon of the desired function using the selection button 430 at step S476 and executes the desired function at step S478. When the user presses the remote control selection button 410 once more after executing the desired function at step S480, the icons displayed on the LCD are removed, and the four direction input buttons 420 and the selection button 430 return to their original functions.

As described above, the present invention provides a wireless remote controller having a navigation function and method of providing the navigation function to the same, which can increase the usability of the remote controller by allowing users to easily and conveniently implement functions through the navigation function thereof, and which can expand the functions of the remote controller by allowing users to update the information of continuously developed devices and functions through a separate data input unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless remote controller having a navigation function, said wireless remote controller comprising:
   a wireless transmission/reception unit by which in a first mode, remote control key code information is transmitted to controlled devices; and
   a display unit by which in a second mode, device information for the controlled devices based on control information input in the first mode is displayed, the display unit allowing navigation of the device information.

2. A wireless remote controller having a navigation function, said wireless remote controller comprising:
   a wireless transmission/reception unit configured to wirelessly communicate with a plurality of controlled devices;
   a display unit configured to display device information of the plurality of controlled devices;
   a storage unit configured to store the device information and remote control key code information of the plurality of controlled devices;
   function keys configured to selectively operate in a first mode in which the remote control key code information corresponding to a user input is transmitted by said wireless transmission/reception unit, and in a second mode in which the device information of currently displayed devices of the plurality of controlled devices displayed on said display unit is navigated to select device information of at least one desired device of the currently displayed devices;
   a mode switching element configured to select one of the first mode and the second mode;
   a device information selecting key configured to select device information of the desired device in the second mode; and
   a control unit configured to control the remote control key code information corresponding to the user input to be transmitted by the wireless transmission/reception unit in the first mode, and to control the device information corresponding to the user input to be provided to said display unit in the second mode.

3. The remote controller as set forth in claim 1 or 2, wherein the remote control key code information corresponding to the input of the user is not transmitted through the wireless transmission/reception unit in the second mode.

4. The remote controller as set forth in claim 1 or 2, wherein the display unit provides the device information stored in the storage unit in the form of icons.

5. The remote controller as set forth in claim 2, wherein the function keys include a channel selecting key.

6. The remote controller as set forth in claim 2, wherein the function keys include a sound selecting key.

7. The remote controller as set forth in claim 2, wherein the function keys include a channel selecting key and a sound selecting key.

8. The remote controller as set forth in claim 1 or 2, wherein the device information includes device identification information.

9. The remote controller as set forth in claim 1 or 2, wherein the device information includes device function information.

10. The remote controller as set forth in claim 1 or 2, wherein a display of the device information includes device deleting information for deleting the device identification information.

11. The remote controller as set forth in claim 1 or 2, wherein a display of the device information includes function deleting information for deleting the device function information.

12. The remote controller as set forth in claim 1 or 2, further comprising an interface unit configured to receive the device information from an outside system.

13. A method of providing a navigation function to a wireless remote controller, the method comprising:
    switching a first mode in which remote control key code information of a device of a plurality of controlled devices is wirelessly transmitted to the device to a second mode in which device information of the plurality of controlled devices is provided to a user;
    displaying in a second mode, device information for the controlled devices based on the device of a plurality of devices of controlled devices for which control information is wirelessly transmitted in the first mode;
    navigating the device information in the second mode; and
    selecting information about at least one desired device of the plurality of controlled devices from the device information.

14. The method as set forth in claim 13, wherein the device information includes device identification information.

15. The method as set forth in claim 13, wherein the device information includes device function information.

16. The method as set forth in claim 13, wherein a display of the device information includes device deleting information for deleting the identification information of devices.

17. The method as set forth in claim 13, wherein a display of the device information includes device function deleting information for deleting the device function information.

18. The method as set forth in claim 13, wherein in the second mode, device information is provided in the form of icons.

19. A method of providing a navigation function to a wireless remote controller, the method comprising:
    switching a first mode in which remote control key code information of a device of a plurality of controlled devices is wirelessly transmitted to the device to a second mode in which device information of the plurality of controlled devices is provided to a user;
    navigating the device information in the second mode; and
    selecting information about at least one desired device of the plurality of controlled devices from the device information,
    wherein in the second mode, the navigating further comprises navigating the device information without wireless transmission of the remote control key code information corresponding to user input.

* * * * *